Figure 1:
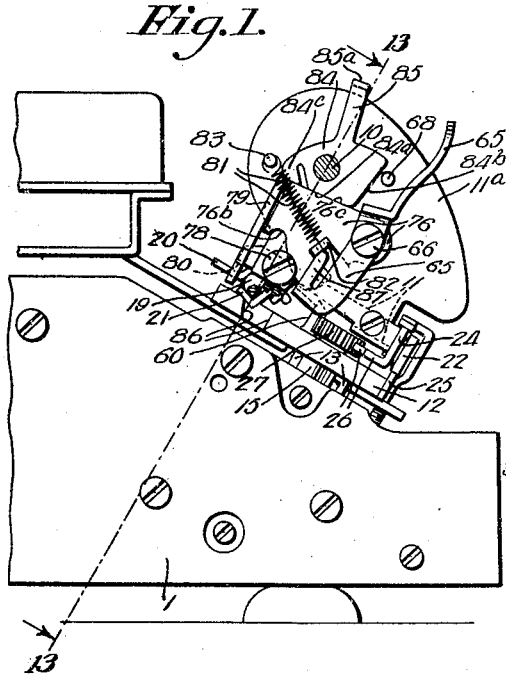

Nov. 27, 1928.

A. B. ELY 1,692,890

TYPEWRITING MACHINE

Filed Nov. 13, 1926    3 Sheets-Sheet 1

INVENTOR
*Alonzo B. Ely*
BY

ATTORNEYS

Nov. 27, 1928.
A. B. ELY
1,692,890
TYPEWRITING MACHINE
Filed Nov. 13, 1926   3 Sheets-Sheet 2
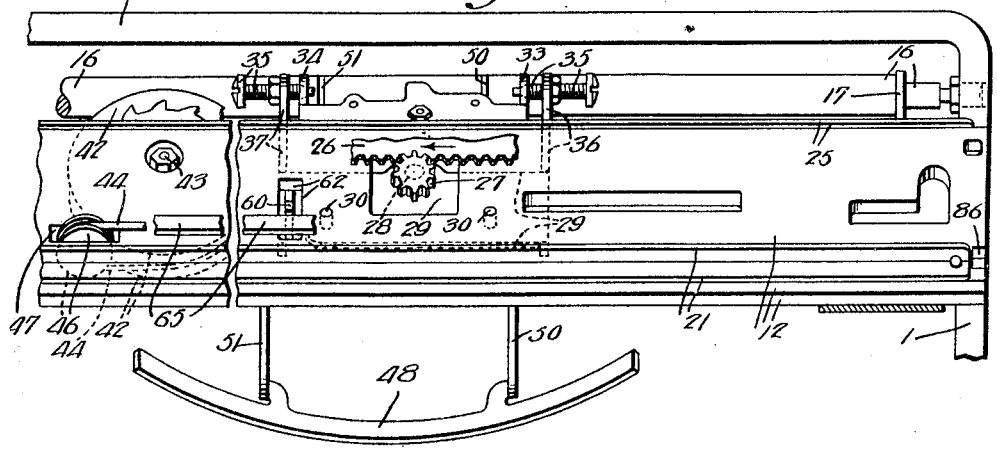
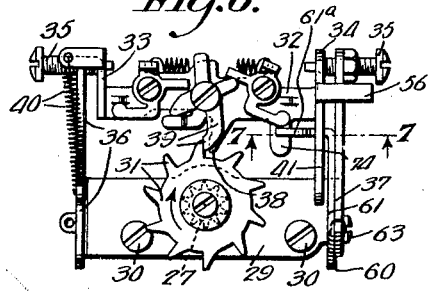
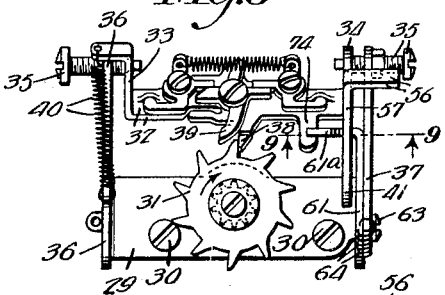
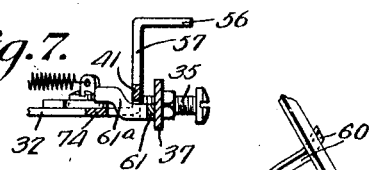
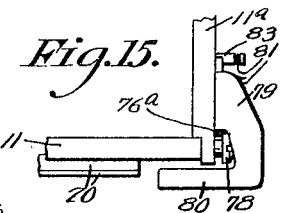
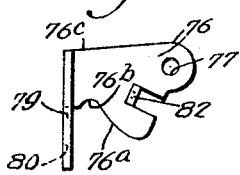
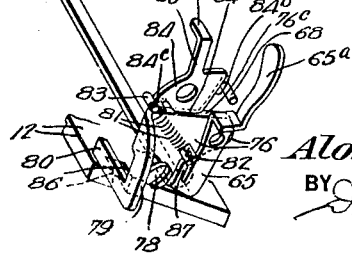
INVENTOR
Alonzo B. Ely
BY
ATTORNEYS Nov. 27, 1928.
A. B. ELY
1,692,890
TYPEWRITING MACHINE
Filed Nov. 13, 1926   3 Sheets-Sheet 3
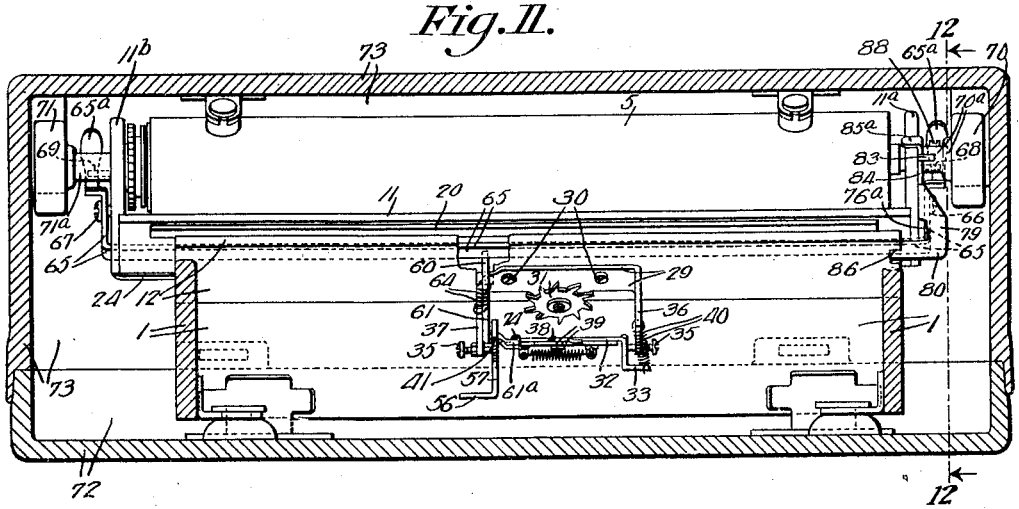
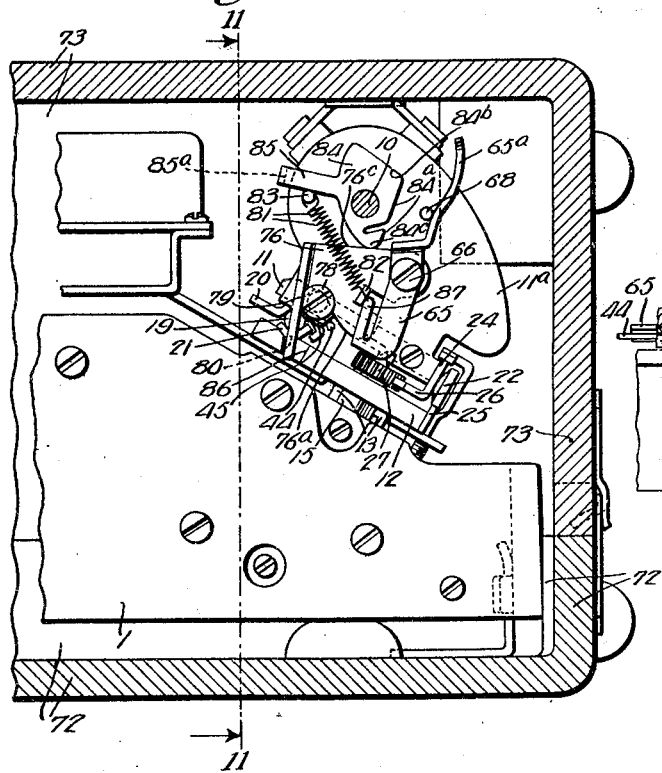
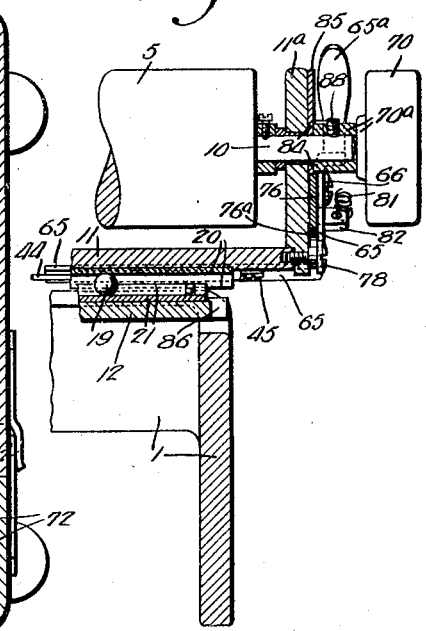
INVENTOR
Alonzo B. Ely
BY
ATTORNEYS Patented Nov. 27, 1928.

1,692,890

UNITED STATES PATENT OFFICE.

ALONZO B. ELY, OF GROTON, NEW YORK, ASSIGNOR, BY MESNE ASSIGNMENTS, TO L C SMITH & CORONA TYPEWRITERS INC., OF SYRACUSE, NEW YORK, A CORPORATION OF NEW YORK.

TYPEWRITING MACHINE.

Application filed November 13, 1926. Serial No. 148,247.

This invention relates to typewriting machines, and more particularly to portable typewriting machines for which carrying cases are provided in which the machine is adapted to be inclosed for transportation.

The principal objects of the invention are to provide improved means for readily conditioning the machine for inclosure within a carrying case of minimum size; to provide means for releasing the carriage escapement and quickly centering the carriage over the main frame at a single operation; to provide means operable to set a centering stop for the carriage and simultaneously release the carriage escapement to permit the carriage to jump to centered position, said means being so constructed as to remain in set position so positively moved by hand to its normal until positively moved by hand to its normal inactive position; to provide a hand-operated actuating member operable directly on a centering stop to set said stop in stopping position and hold it there when the hand of the operator is removed from said member, and so associate said stop with the escapement releasing means of the machine that said stop will directly actuate said means and hold it in releasing position when the stop is shifted into stopping position; to provide a normally ineffective centering stop traveling with the carriage, and manually-operable means on the carriage for shifting said stop into a position for engagement with a fixed abutment to arrest travel of the carriage toward the left, which means is effective to shift said stop only when said stop is located to the right of said abutment; to provide a centering stop on the carriage spring-urged to ineffective position and a stop setting device on the carriage loosely engageable with said stop and movable to stop-setting and stop-releasing position; to provide a normally ineffective centering stop on the carriage acting to release, and hold released, the carriage escapement when set in effective position, a cam device on the carriage manually operable to set and lock the stop in position for engagement with a fixed abutment and to release the stop, and auxiliary locking means independent of the carriage co-operating with the stop to hold the stop in set position only while the stop is engaged with said abutment, said stop being releasable from said auxiliary locking means by movement of the carriage toward the right; and to provide a carriage-centering and escapement-release-mechanism actuating means of sturdy and inexpensive construction, consisting of a minimum number of parts, and positive and certain in its action.

To the foregoing and other ends, which will appear from the following description of the preferred embodiment of the invention, the invention consists in the features of construction, arrangements of parts, and combinations of elements pointed out in the appended claims.

Figure 2:
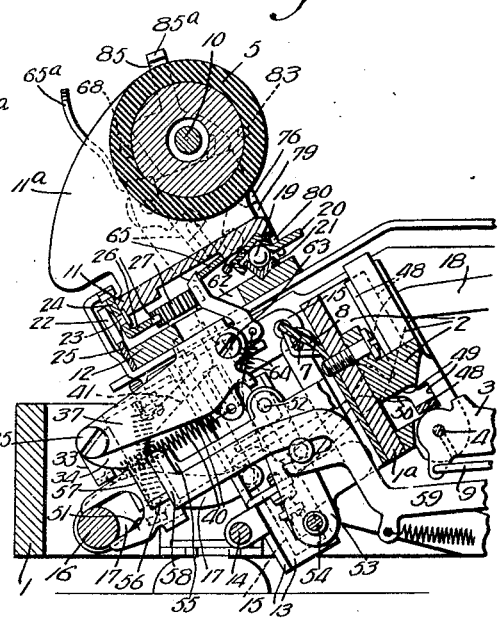
Figure 3:
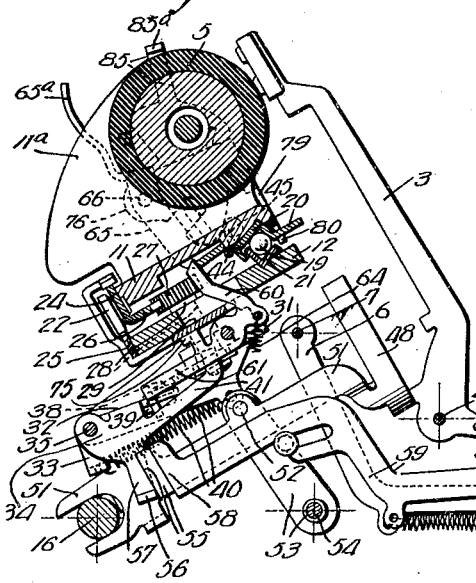
Figure 4:
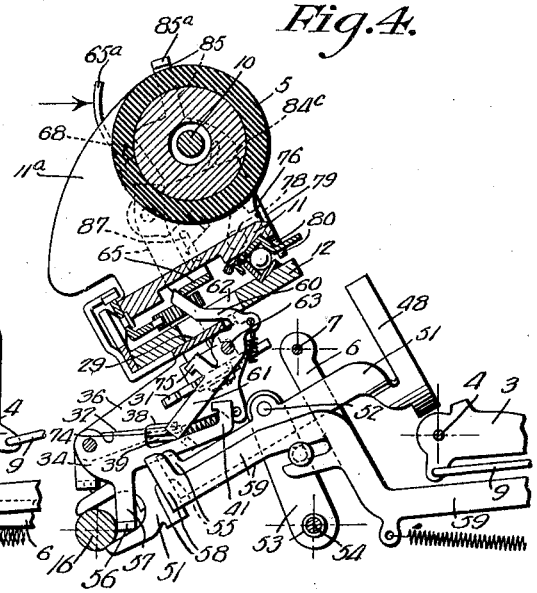

In the accompanying drawings,

Fig. 1 is a fragmentary right hand side elevation of a portable typewriting machine in which the improvements are embodied in their preferred form, the several parts being in normal position;

Fig. 2 a fragmentary longitudinal sectional view of the machine, the parts being in normal position;

Fig. 3 a fragmentary longitudinal sectional view showing the parts positioned as at the end of a printing stroke of a type bar;

Fig. 4 a fragmentary longitudinal sectional view showing the escapement release bail of the machine actuated to release the carriage from the control of the escapement mechanism;

Fig. 5 a fragmentary top plan view of the machine, the platen carriage being removed;

Fig. 6 a bottom plan view of the escapement mechanism, with the parts in normal position as in Fig. 2;

Fig. 7 a section on the line 7—7 of Fig. 6;

Fig. 8 a view similar to Fig. 6, but with the parts positioned as in Fig. 3;

Fig. 9 a section on the line 9—9 of Fig. 8;

Fig. 10 a perspective view of the carriage centering means, the carriage being omitted, and the parts being positioned as when the carriage is one letter-space to the left of centered position;

Fig. 11 a section on the line 11—11 of Fig. 12;

Fig. 12 a section on the line 12—12 of Fig. 11 showing the machine inclosed within its carrying case;

Fig. 13 a section on the line 13—13 of Fig. 1;

Fig. 14 a side view of the center stop member on the carriage; and

Fig. 15 a front view of the center stop, attached to the carriage.

The improvements have been shown embodied in a three-quarter-strike portable typewriting machine constructed as more fully disclosed in the applications of H. A. Avery, Otto Petermann and E. L. Harmon, Serial Nos. 148,255 and 148,257, both filed November 13, 1926.

Only so much of the machine has been shown and will be described as is necessary for a full understanding of the present invention. The main frame, the platen carriage, the case shift mechanism (including the shift frame supporting the carriage), and the type bar action are all constructed as disclosed in said applications and substantially as in the well known Corona Four machine. The main frame 1 of the machine is provided with a transverse partition wall 1ª lying in an upwardly and rearwardly inclined plane. The arcuate type bar segment 2 is held to the front face of wall 1ª so as to lie in a similarly inclined plane, and the type bars 3 are pivoted on the usual arcuate pivot wire 4 in the segment to strike on the upper front quarter of the platen 5, said type bars being actuated by the character key levers 6 which are pivoted on a transversely extending pivot wire 7 held to a fulcrum plate 8 attached to the rear face of wall 1ª. The key levers 6 extend down and then forward under wall 1ª to the keyboard and are connected with the type bars by operating connections including links 9.

The platen 5 has its shaft 10 journalled in the end plates 11ª and 11ᵇ of the platen carriage which comprises said end plates and a flat base plate 11 to which they are held. The carriage is mounted on a shift frame comprising a carriage bed 12, a pair of depending guide members 13 held to the bed, and a brace rod 14 connecting said guide members at their lower ends. The shift frame is guided to move upward and rearward parallel with wall 1ª being supported with the carriage thereon in an upwardly and rearwardly inclined plane by a pair of guide members 15 held to the side walls of main frame 1. Guides 13 and 15 extend parallel to wall 1ª (between said wall and the back wall of frame 1), and the carriage bed 12 and carriage base plate 11 lie in parallel planes perpendicular to wall 1ª over the space between wall 1ª and the back wall of frame 1. The shift frame is shiftable to change case by means including a rock shaft 16 (journalled on the side walls of the main frame), and a rock arm 17 on said shaft which is connected with the adjacent guide member 13 and the rear end of a shift key lever 18. Suitable antifriction bearings are confined between guide members 13 and the cooperating guide members 15.

The carriage travels along bed 12 on forward ball bearings 19 (confined between raceway members 20 and 21 held to the carriage base plate 11 and bed 12, respectively) and a rear roller bearing 22 (journalled on a stub shaft 23 held to a bar 24 secured to the rear edge of the carriage base plate 11), said bearing roller 22 being located midway the ends of the carriage and traveling on the upper edge of a bar 25 held to the rear edge of carriage bed 12. The foregoing parts are all constructed as in the Corona Four machine and as disclosed in the applications above referred to and the application of Ely and Harmon, Serial No. 66,000, filed October 31, 1925.

The escapement mechanism and escapement releasing mechanism, together with the means for operating the escapement mechanism, are constructed as disclosed in said application of Avery, Peterman and Harmon, Serial No. 148,257. These parts include a rack 26 formed integrally with bar 24 on the platen carriage, a feed pinion 27 meshing with said rack, a shaft 28 to which pinion 27 is held (journalled in a bracket 29 held to the bottom of bed 12 by screws 30), a toothed escapement wheel 31 which is held to shaft 28, a dog rocker 32 having pendent ears 33 and 34 pivoted on screws 35 carried on arms 36 and 37 of bracket 29, and a fixed or holding dog 38 and a pivoted or feed dog 39 on the rocker, both arranged to cooperate with wheel 31 to feed the carriage from right to left. The dog rocker is normally swung upward by a return spring 40 (connecting pivot ear 33 with bracket arm 36) to maintain the forward end of a stop arm 41 (formed on pivot ear 34) engaged with the under face of bracket 29 and the feed dog 39 engaged by a tooth of the escapement wheel 31, as shown in Figs. 2 and 6. The carriage is normally urged toward the left by a spring drum 42 supported on the carriage bed 12 at 43 and having the usual draw-band or cable 44 attached at one end thereto and attached at its other end to a screw 45 tapped into the bottom of the carriage base plate 11 near the right hand end of the carriage. Cable 44 passes over a pulley 46 journalled in a slot 47 in carriage bed 12 and is provided at its free end with the usual anchor hook for engagement around the shank of screw 45.

The dog rocker is movable from the position shown in Figs. 2, 6 and 7 to that shown in Figs. 3, 8 and 9 on the printing strokes of the type bars by means of a universal bar 48 which vibrates in a recess 49 in the rear face of segment 2 in a path perpendicular to the planes of said segment and wall 1ª. The universal bar has side arms 50 and 51 extending rearward and downward through wall 1ª and offset inwardly at their rear ends. The inwardly offset ends of the universal bar side arms are slotted, as shown, to slidably guide and support the bar on shaft 16, and said side arms are connected by pivots 52 with a rocking frame 53 journalled on the main frame to swing about the axis 54. The side arm 51 is formed with a tappet or shoe 55 alongside its inwardly offset and slotted rear end adapted to push rearwardly on a contact lug 56 extending outward from a pendent arm 57 formed on pivot ear 34 of the dog rocker. The dog rocker is also adapted to be actuated by a tappet 58 formed on a tappet bar 59 operated from the space bar, not shown.

The universal bar is normally yieldably held in the position shown in Fig. 2 by restoring means including a return spring, not shown. Upon depression of a character key the universal bar is moved rearward by the actuated type bar 3 and rocks the dog rocker to the position shown in Figs. 3, 8 and 9 to disengage the feed dog 39 from escapement wheel 31 and move the holding dog 38 into wheel-holding position. On the return of the type bar the universal bar and dog rocker return to normal position and the carriage is arrested by feeding dog 39 after advancing one letter space.

Hand-operated means is provided for releasing the escapement for running movements of the carriage. This means includes a dog-rocker-depressing bell-crank lever 60—61 having its rearwardly extending arm 61 formed with a lateral extension 61ª overhanging arm 41 of the dog rocker, the forward arm 60 of said bell-crank extending up through a slot 62 in carriage bed 12 into the space between said bed and the base plate 11 of the carriage. The bell-crank is pivoted on a pivot screw 63 extending through bracket arm 37 and is normally held in the position shown in Figs. 2, 3, 6, and 8 by a return spring 64 connecting its arm 60 with said bracket arm 37. The bell-crank is adapted to be rocked to the position shown in Fig. 4 by a hand-operated release bail 65 whose cross-bar normally travels along with the carriage in front of bell-crank arm 60 which holds the side bail in normal inactive position. The side arms of the bail 65 are pivoted on screws 66 and 67 tapped into the carriage end plates 11ª and 11ᵇ, respectively, below and in rear of the platen shaft 10, the bail side arms being formed with finger pieces 65ª extending upward behind the platen shaft to points above the level of said shaft. By pressing forward on one or both finger pieces until they are arrested (as shown in Fig. 4) by engagement with stop studs 68 and 69 projecting outward from end plates 11ª and 11ᵇ, respectively, bell-crank 60—61 is rocked until extension 61ª thereof forces the dog rocker downward far enough to carry both escapement dogs below and out of cooperative relation with the escapement wheel, thereby freeing the carriage from the control of the escapement. Upon release of the bail the parts return to normal position, feeding dog 39 again engaging a tooth of wheel 31 to hold the carriage. A stop lug 75 on the bell-crank arm 61 normally engages the bottom face of bracket 29 to limit return movement of the bell-crank and bail by spring 64. A stop lug 74 on the dog rocker engages the inner end of bell-crank extension 61ª as a type bar strikes the platen to prevent overthrow of the dog rocker.

The machine is provided with finger wheels 70 and 71 the hubs 70ª and 71ª of which are mounted on the projecting ends of the platen shaft 10. In order that the usual carrying case of the machine (comprising base section 72 and the usual detachable cover section 73) may be of minimum width corresponding substantially with the distance between the outer ends of the finger wheels, it is necessary to position the carriage substantially centrally over the carriage bed, i. e. substantially midway between the two limits of travel of the carriage. It is also desirable that the escapement be held released while the machine is in its case, in order that shocks during handling of the case may not damage the escapement mechanism, particularly the feed dog. Simple means has been provided whereby the carriage may be quickly centered and whereby the escapement release mechanism is actuated by actuation of the centering means and held in escapement releasing position until freed by the operator.

A sheet metal stop plate 76 is provided with a bearing aperture 77 at its upper rear corner through which extends the shank of release bail pivot screw 66, said plate lying flatwise against the outer face of carriage end plate 11ª and being held thereagainst at its rear end, to swing about screw 66, by said screw 66 and the right hand side arm of release bail 65 which extends across the outer face of the rear end of the plate. The head of a shouldered retaining screw 78, tapped into carriage end plate 11ª and carriage base plate 11 at the lower front corner of said end plate, engages the outer face of plate 76 along the arcuate lower edge 76ª of the plate 76 to hold the forward end of the plate 76 against outward movement from the face of carriage end plate 11ª, the lower edge portion 76ª of plate 76 being curved forward and upward about pivot aperture 77 as a center and forming at its forward end the rear wall of a notch 76ᵇ in the plate 76 in which the shank of screw 78 engages when the stop plate is in stopping position. The provision of notch 76ᵇ affords a broad bearing of the head of screw 78 against the outer face of stop plate 76 to take the shock resulting from stopping of the released carriage in centered position, as hereinafter described, and relieves the strain on pivot 66 incident to holding of the carriage by the stop plate against the pull of the spring drum 42 while the carriage is centered and the escapement released.

An integral stop-carrying arm 79 depends from the forward edge of plate 76, said arm being bent outward at its junction with the plate to lie flatwise entirely to the right of carriage end plate 11ᵃ in a plane perpendicular to the plane of the stop plate 76 and end plate 11ᵃ and parallel with the path of travel of the carriage. A centering stop in the form of an integral lug 80 extends inward or toward the left from the lower end of arm 79, said lug lying flatwise in the same plane as arm 79. By this arrangement of stop 80 and its supporting arm 79 edgewise to the line of impact, the stop device has the necessary strength and rigidity notwithstanding the fact that it is stamped from thin sheet steel stock.

Stop lug 80 normally extends inward under the carriage base plate 11, terminating short of the right hand end of raceway 20 on the said base plate, and is adapted to normally travel above the carriage bed 12 forward of raceway 21 on said bed. The stop plate 76 is normally urged upward by a return spring 81 connected at its lower end with a lug 82 stamped outward from the rear end portion of said plate, said lug being located below and forward of pivot 66 and said spring extending upward and forward from said lug to a stud 83 held to and projecting outward from carriage end plate 11ᵃ at a point forward of the platen shaft. The straight upper edge 76ᶜ of plate 76 normally abuts flat against the straight edge 84ᵃ of a sheet metal cam plate 84 which is substantially triangular and is pivoted substantially centrally thereof on the platen shaft 10 at the outer face of carriage end plate 11ᵃ, directly over plate 76. The rear edge 84ᵇ of cam 84 normally extends upward and rearward substantially at a right angle to edge 84ᵃ and normally is substantially in engagement with stop stud 68 for release bail 65—65ᵃ. An operating arm 85 formed integrally with cam 84 normally extends upward and rearward from the upper edge of the cam and is bent inward over the upper edge of the carriage end plate to form a finger piece 85ᵃ adapted to be moved forward and downward around the upper front edge portion of the carriage end plate 11ᵃ which is curved in an arc substantially concentric with the platen shaft. Stud 68 is adapted to be engaged by edge 84ᵇ of cam 84 to prevent any material backward swinging of the operating arm 85 from normal position, and it will be evident that the engagement of plate edge 76ᶜ with cam edge 84ᵃ will arrest swinging of the stop plate 76 by its return spring 81 with the parts positioned as in Figs. 1 to 4, 10, 13, and 15, wherein the stop lug 80 is in its normal ineffective position before described.

Stop lug 80 is adapted to be positioned for engagement with the right hand end edge of the carriage bed 12 to arrest the carriage in centered position. Preferably said end edge of the bed is provided with a notch, as 86, the inner end wall of which is adapted to be engaged by the inner end of lug 80 and the forward wall of which lies preferably parallel with and close to the front face of lug 80 when the lug enters said notch, for the purpose hereinafter described. To center the carriage it is necessary to first move the carriage to the right of centered position, if not already there, which may be done by returning the carriage by the usual line-spacing and carriage returning lever, for example, or by means of the finger wheels. The construction and arrangement of the stop plate and its stop lug are such, as above described, that the cam 84 cannot be actuated to set the stop in stopping position and release the escapement unless the stop lug is to the right of the right hand end of the carriage bed, as attempted rocking of the cam would be prevented by immediate engagement of the lower edge of the stop lug with the top face of the carriage bed 12.

With the carriage at any point to the right of centered position, all that is necessary to be done to center the carriage is for the operator to pull forward on finger piece 85ᵃ with the forefinger of one hand, for example, until rocking of the cam 84 is arrested by its operating arm 85 striking the spring anchor stud 83, whereupon the carriage will instantly jump to the left to centered position where it will be arrested by stop lug 80 engaging the inner end wall of notch 86 in carriage bed 12. The above described rocking of cam 84 carries the cam to the position shown in Figs. 11 and 12, in which the pointed forward end or nose portion 84ᶜ of the cam has rocked stop plate 76 downward about pivot 77 to carry lug 80 into the plane of carriage bed 12 and directly opposite the notch 86 in the bed. This movement of plate 76 carries spring anchor lug 82 on the plate rearward, said lug rocking the escapement releasing bail to its releasing position by rearward pressure on a finger 87 extending upward from the right hand end of the cross-bar of the bail and normally engaged behind said lug 82. Finger 87 is bendable fore and aft for purposes of adjustment to insure full release movement of the bail when operated by the stop plate. It will be obvious, therefore, that the setting of the centering stop to effective position simultaneously releases the escapement so that the carriage will instantly jump to the centered position under the pull of spring drum 42.

In order that the stop may not return to normal position during such jumping movement, and until the operator again desires to use the machine, operating arm 85 of the cam and its stop stud 83 are so disposed that nose 84ᶜ of the cam (when arrested by said stop stud with the centering stop in effective position) engages the edge 76ᶜ of stop plate 76 at a point in which said plate and its spring tend to rock the cam in counterclockwise direction, as viewed in Fig. 12, and thus yieldably hold the cam in its shifted position where it prevents unsetting of the centering stop until the cam is restored by hand to normal position.

By providing an abutment engaged by the centering stop, in the form of the end wall of notch 86, a rearwardly facing shoulder (comprising the front wall of said notch) is provided which acts as an auxiliary holding means to prevent unsetting of the centering stop while the carriage is in centered position and the machine is enclosed in its case. When enclosed in the carrying case, endwise travel of the carriage is prevented by the side walls of the case, and in some known constructions, as in the case of the Corona Four machine, by special carriage holding means on the case. It will be obvious that, with the construction described and shown herein, even if cam 84 should (as the result of shocks in transportation, or from any other cause, such as disconnection or breakage of spring 81) accidently return to normal position while the machine is encased, or be accidently rocked to normal position before closure of the case, stop plate 76 cannot swing to normal position to release the escapement since lug 80 is engaged behind the front wall of the notch 86.

When it is desired to use the machine following a carriage-centering operation, cam 84 is rocked back to normal position through the finger piece 85ᵃ and the carriage moved to the right to carry lug 80 out of notch 86. The nose 84ᶜ of the cam is made adjustable by slotting the cam upward from edge 84ᵃ a short distance from the pointed front end of the cam to permit bending of the nose in the plane of the cam body.

By providing a rigid centering stop on the carriage, acting to release the escapement when moved to set position, and rigidly held in set position, and a rigidly supported and non-yielding stationary part engageable by the centering stop to arrest the freed carriage in centered position, the centering means is adapted to withstand shocks incident to arrest of the carriage and is made certain or positive in its action, and by arranging the co-acting stopping elements with relation to each other and to the escapement release means of the machines as disclosed herein, the traveling stop may be set and locked in set position, and be employed to release the escapement to permit the carriage to jump automatically into centered position from any point to the right of centered position.

The cam 83 is rotatably and removably held on the platen shaft 10 by being confined between end plate 11ᵃ and hub 70ᵃ of finger wheel 70, the hub of said finger wheel being detachably locked on the platen shaft by a set screw 88, as shown in Fig. 13.

What I claim is:

1. In a typewriting machine, a spring-driven platen carriage, escapement mechanism for the carriage, a normally ineffective carriage-centering stop pivoted on the carriage to swing transversely of the path of travel of the carriage, a co-operating non-traveling stop on the machine, a manually rockable stop-setting cam pivoted on the carriage to swing about an axis parallel with the pivotal axis of the centering stop and adapted to directly rock the centering stop to effective position, escapement releasing means operable by the centering stop upon movement of said stop to effective position, and a spring connecting the centering stop with the carriage to normally hold the stop in ineffective position, said cam and spring-returned centering stop being so engaged when the stop is moved to set position as to hold each other against return movement.

2. In a typewriting machine, a carriage bed having a transverse notch in its right hand end, a traveling platen carriage mounted on said bed and spring urged toward the left, a stop member pivoted on the carriage at the right hand end of the carriage to swing about an axis parallel with the path of travel of the carriage between an ineffective position in which the stop may travel past the bed and an effective position in which the stop is adapted to engage the inner end wall of said notch when the carriage reaches a substantially central position on the bed, stop setting means mounted on the carriage adapted to swing the stop to effective position, a spring connected with the stop and carriage acting normally to hold the stop in ineffective position, escapement mechanism for the carriage, means whereby the setting of the stop releases the carriage from control of its escapement mechanism, and means whereby the stop-setting means and stop mutually co-act to releasably lock each other in set position.

3. In a typewriting machine, a traveling carriage, a normally ineffective centering stop pivoted on the carriage, a return spring for said stop, stationary means engageable by said stop when the stop is set into effective position to arrest the carriage in centered position, a hand-operated cam pivoted on the carriage for setting the stop against the resistance of its return spring into position for co-action with said stationary means and normally positioned to permit return movement of the stop to ineffective position, means whereby said cam is yieldably held in stop setting position by the set stop, and means independent of the carriage engageable by the set stop only when the carriage is centered to prevent movement of the stop to un-set position irrespective of return movement of the cam to its normal position.

4. In a typewriting machine, a traveling carriage, a normally ineffective centering stop pivoted on the carriage, a return spring for said stop, stationary means engageable by said stop when the stop is set into effective position, a hand-operated cam pivoted on the carriage for setting the stop against the resistance of its return spring into position for coaction with said stationary means, and normally positioned to permit return movement of the stop to ineffective position, means whereby said cam is yieldably held in stop setting position by the set stop, means independent of the carriage engageable by the set stop only when the carriage is centered to prevent movement of the stop to unset position irrespective of return movement of the cam to its normal position, escapement mechanism for the carriage, and means operable by the stop upon movement to effective position for releasing the carriage from control of the escapement mechanism, said releasing means being held in carriage releasing position by the set stop.

5. In a typewriting machine, a traveling spring driven platen carriage, escapement mechanism for the carriage, escapement releasing means including a hand-operated member on the carriage, a stationary stop, a stop pivoted on the carriage to swing to and from an ineffective position with relation to said stationary stop, a hand-operated stop-setting cam pivoted on the carriage and effective, when rocked from normal position, on said pivoted stop to cause said stop to move to set position and actuate said hand-operated member of the escapement releasing means, a return spring for the pivoted stop, said pivoted stop and pivoted cam being mutually co-operative to hold each other in stop-setting position and the pivoted stop co-operating with said hand-operated member to maintain the escapement released until the cam is restored to normal position to release the set pivoted stop.

6. In a typewriting machine, a traveling carriage, escapement mechanism for the carriage, cooperating pivoted and fixed stops on the carriage and a relatively stationary part of the machine, respectively, and adapted when engaged to arrest the carriage substantially midway between its limits of travel, a finger piece supported on the carriage for swinging movement about a fixed axis, and means whereby swinging of said finger piece in one direction releases the carriage from control of the escapement mechanism and swings said pivoted stop and locks it to move in a path in which the fixed stop is located.

7. In a typewriting machine, a traveling carriage, escapement mechanism for the carriage, cooperating pivoted and fixed stops on the carriage and a relatively stationary part of the machine, respectively, and adapted when engaged to arrest the carriage substantially midway between its limits of travel, a finger piece supported on the carriage for swinging movement about a fixed axis, means whereby swinging of said finger piece in one direction releases the carriage from control of the escapement mechanism and swings said pivoted stop and locks it to move in a path in which the fixed stop is located, and means whereby actuation of said finger-piece to release the carriage and position said pivoted stop is prevented when the carriage has been fed by the escapement to a point at which the pivoted stop has passed the fixed stop.

8. In a typewriting machine, a carriage spring-driven in one direction, an escapement for the carriage, a pair of stops for arresting advance of the carriage substantially midway the limits of its travel upon release of the same from control of the escapement, one of said stops being mounted on the carriage and normally adapted to pass the other, hand-operated means on the carriage adapted to set and lock the stop on the carriage to travel in a path in which the other stop is located, and simultaneously effect release of the carriage from control of the escapement, and means whereby said hand-operated means is effective to set the carriage stop and release the escapement only when the carriage stop, when so set, is movable by the carriage-driving spring toward the other stop.

9. In a typewriting machine, a carriage bed, a spring driven carriage mounted on the bed having end plates, an escapement for the carriage, escapement releasing means, a platen on the carriage having a shaft extending through and journalled in said end plates, a stop setting cam pivoted on the platen shaft and provided with a finger piece, a finger wheel held to one end of the platen shaft and holding said cam against the outer face of the adjacent end plate, a carriage stop member pivotally held at one end against the outer face of the end plate against which the cam is held and extending under the cam, a retaining member held to said carriage end plate and engaging the outer face of the carriage stop member in all positions of said stop member, a spring connecting said carriage stop member with the carriage to normally swing the stop member upward to a position in which it is adapted to travel past the bed, said cam being rockable in one direction by its finger piece to swing the carriage stop downward into position for engagement with the right hand end of the bed.

10. In a typewriting machine, a carriage bed, a spring driven carriage mounted on the bed having end plates, an escapement for the carriage, escapement releasing means, a platen on the carriage having a shaft extending through and journalled in said end plates, a stop setting cam pivoted on the platen shaft and provided with a finger piece, a finger wheel held to one end of the platen shaft and holding said cam against the outer face of the adjacent end plate, a carriage stop member pivotally held at one end against the outer face of the end plate against which the cam is held and extending under the cam, a retaining member held to said carriage end plate and engaging the outer face of the carriage stop member in all positions of said stop member, a spring connecting said carriage stop member with the carriage to normally swing the stop member upward to a position in which it is adapted to travel past the bed, said cam being rockable in one direction by its finger piece to swing the carriage stop downward into position for engagement with the right hand end of the bed, and to hold said stop member depressed against the tension of its return spring until manually rocked in the opposite direction.

11. In a typewriting machine, a carriage bed, a spring driven carriage mounted on the bed having end plates, an escapement for the carriage, escapement releasing means, a platen on the carriage having a shaft extending through and journalled in said end plates, a stop setting cam pivoted on the platen shaft and provided with a finger piece, a finger wheel held to one end of the platen shaft and holding said cam against the outer face of the adjacent end plate, a carriage stop member pivotally held at one end against the outer face of the end plate against which the cam is held and extending under the cam, a retaining member held to said carriage end plate and engaging the outer face of the carriage stop member in all positions of said stop member, a spring connecting said carriage stop member with the carriage to normally swing the stop member upward to a position in which it is adapted to travel past the bed, said cam being rockable in one direction by its finger piece to swing the carriage stop downward into position for engagement with the right hand end of the bed, said stop member being restrained by the carriage bed from movement by said cam when to the left of the right hand end of the carriage bed, and said stop member being operative on the escapement releasing means to release the escapement when the stop member is depressed by the cam.

12. In a typewriting machine, the combination of a traveling platen carriage, a sheet metal carriage stop member having a flat body part abutting one end of the carriage pivotally held at one end to said carriage end to swing transversely of the path of travel of the carriage and formed at its other end with an integral stop lug lying flatwise in a plane perpendicular to the plane of said body part and parallel with the path of travel of the carriage and having an abutment edge facing toward the opposite end of the carriage, means rigidly held to the carriage co-operating with the body part of said stop member between said lug and the pivot of said member to take up shock transmitted to said body part upon engagement of the abutment edge of the lug with a co-operating stop, and a return spring connected with said stop member and the carriage and normally holding the stop member in inactive position.

13. In a typewriting machine, a spring-driven platen carriage, escapement mechanism for the carriage, an escapement releasing device and a carriage stop both pivotally held to the carriage to swing about a common axis and having engaging portions whereby the escapement releasing member is movable by the stop to escapement releasing position, means normally holding the stop and releasing member in inactive position, a manually operable actuating and locking member for the stop pivoted on the carriage and adapted when rocked in one direction to shift the stop and releasing member to active position and lock them there until manually rocked in the opposite direction, and a stationary stop engageable by the carriage stop when the carriage stop is in active position to arrest the released carriage substantially midway between its maximum limits of travel.

14. In a typewriting machine, a roller platen having a shaft, a platen carriage having end members in which said shaft is journalled, a finger wheel detachably held to one end of the shaft at the outer side of the adjacent end member, a fixed stop independent of the carriage, a co-operating carriage stop pivotally held to the carriage and normally traveling with the carriage in a path to pass the fixed stop, and a hand-operable stop-setting member pivoted on the platen shaft and held between said finger wheel and the adjacent end member of the carriage against endwise movement on the shaft, said setting member being effective when rocked in one direction to swing the pivoted carriage stop into a position for engagement with the fixed stop.

15. In a typewriting machine, a roller platen having a shaft, a platen carriage having end members in which said shaft is journalled, a finger wheel detachably held to one end of the shaft at the outer side of the adjacent end member, a fixed stop independent of the carriage, a co-operating carriage stop pivotally held to the carriage and normally traveling with the carriage in a path to pass the fixed stop, a return spring for the pivoted stop urging it to normal position, and a hand-operable stop-setting member pivoted on the platen shaft and held by said finger wheel and the adjacent end member of the carriage in co-operative relation with the pivoted stop, said setting member normally limiting return movement of the pivoted stop and being effective, when rocked in one direction from normal position, to swing the pivoted stop into a position in which said stop is adapted to engage the fixed stop and in which the setting member and pivoted stop releasably hold each other in shifted position.

16. In a typewriting machine, the combination of a spring-driven platen carriage, escapement mechanism for controlling the feed of the carriage, a carriage centering stop pivotally held to the carriage to travel bodily therewith and to swing relatively thereto transversely of the path of travel of the carriage into and out of effective position, a non-traveling stop located at a point to arrest the carriage approximately midway between the limits of maximum carriage travel when engaged by the centering stop and out of the path of travel of said centering stop when the centering stop is in ineffective position, an actuating member for the centering stop pivotally held to the carriage to swing about an axis parallel with the pivotal axis of the centering stop while in contact with said stop and having a finger-piece by which it is adapted to be manually rocked, a spring connecting the centering stop with the carriage for normally urging the centering stop about its pivot into ineffective position, releasing means for the escapement mechanism directly operable by the centering stop upon movement of said stop to effective position, said actuating member being engageable by the centering stop to determine the normal ineffective position of the centering stop and being arranged to directly engage and swing the centering stop into its effective position when manually rocked about its pivot in one direction, and stopping means engaged by the actuating member to arrest pivotal movement thereof in stop-setting direction with the centering stop in set position and exerting pressure on the actuating member in a direction urging said member in stop setting direction.

17. In a typewriting machine, a spring-driven platen carriage, escapement mechanism for the carriage, escapement-releasing means including a member on the carriage directly operable manually to effect a release of the escapement, a carriage centering stop mounted on the carriage to travel therewith and shift relatively thereto, a cooperative non-traveling stop located to arrest the carriage in a substantially centered position when engaged by the centering stop, a return spring connecting the centering stop with the carriage to normally hold the centering stop in position to travel past the non-traveling stop, a manually operable setting member for the shiftable centering stop mounted on the carriage to travel therewith and shift relatively thereto and directly engageable with the centering stop to shift said stop into a position in which it is set for engagement with the non-traveling stop, and means for arresting manual shifting movement of said stop-setting member in stop-setting direction at a point at which said setting member is held in stop-setting position by back pressure thereagainst of the spring-urged set stop, said centering stop being arranged to directly engage and shift said manually operable member of the escapement-releasing means to escapement releasing position during movement of the stop-setting member to stop-setting position.

18. In a typewriting machine, the combination of a spring-driven platen carriage, escapement mechanism for controlling the feed of the carriage, a carriage centering stop pivotally held to the carriage to travel bodily therewith and to swing relatively thereto transversely of the path of travel of the carriage into and out of effective position, a non-traveling stop located at a point to arrest the carriage approximately midway between the limits of maximum carriage travel when engaged by the centering stop and out of the path of travel of said centering stop when the centering stop is in ineffective position, an actuating member for the centering stop pivotally held to the carriage to swing about an axis parallel with the pivotal axis of the centering stop while in contact with said stop and having a finger-piece by which it is adapted to be manually rocked, a spring connecting the centering stop with the carriage for normally urging the centering stop about its pivot into ineffective position, and releasing means for the escapement mechanism directly operable by the centering stop upon movement of said stop to effective position, said actuating member being engageable by the centering stop to determine the normal ineffective position of the centering stop and being arranged to directly engage and swing the centering stop into its effective position when manually rocked about its pivot in one direction.

19. In a typewriting machine, a spring-driven platen carriage, a carriage centering stop mounted on the carriage to travel therewith and shift relatively thereto, a cooperative non-traveling stop located to arrest the carriage in a substantially centered position when engaged by the centering stop, a return spring connecting the centering stop with the carriage to normally hold the centering stop in position to travel past the non-traveling stop, a manually operable setting member for the shiftable centering stop mounted on the carriage to travel therewith and shift relatively thereto and directly engageable with the centering stop to shift said stop into a position in which it is set for engagement with the non-traveling stop, means for arresting manual shifting movement of said stop setting member in stop-setting direction at a point at which said setting member is held in stop-setting position by back pressure thereagainst of the spring-urged set stop, and means for releasing the carriage from the control of the escapement directly engaged and operated to free the carriage by the centering stop during movement of the stop by its setting member to set position.

20. In a typewriting machine, a spring-driven platen carriage, escapement mechanism for the carriage, a normally ineffective carriage-centering stop pivoted on the carriage to swing transversely of the path of travel of the carriage into and out of effective position, a co-operating non-traveling stop on the machine, a manually rockable stop-setting cam pivoted on the carriage for direct rocking of the centering stop thereby into effective position, means operable by the centering stop during movement of said stop to effective position for freeing the carriage from control of the escapement mechanism, and a spring for normally yieldably holding the centering stop in ineffective position, said cam and spring urged centering stop being adapted to releasably hold each other against return movement when the stop is moved to effective position by the cam.

21. In a typewriting machine, a traveling platen carriage, a non-traveling carriage stop, a traveling carriage stop mounted on the carriage to travel bodily with the carriage and for shifting movement relatively to the carriage between an unset position in which it is so located as to adapt it to pass the non-traveling stop and a set position in which it is so located as to abut the non-traveling stop upon travel of the carriage to a point at which the carriage is substantially centered over the frame of the machine, a manually shiftable setting member for the traveling stop mounted on the carriage to travel bodily therewith and for manual shifting movement relatively to the carriage between a stop-setting position and a normal unset position in which the traveling stop is free to move to its normal unset position, said setting member and traveling stop being normally spring-held in direct engagement with each other in unset position and mounted for movement relatively to each other while engaged against the spring influence upon manual shifting of the setting member in one direction from the normal relative unset positions of said member and stop to the relative set positions of said member and stop in which said member and stop mutually coact under the spring influence to releasably hold each other against return movement.

22. In a typewriting machine, a traveling platen carriage, a non-traveling carriage stop, a traveling carriage stop mounted on the carriage to travel bodily with the carriage and for shifting movement relatively to the carriage between an unset position in which it is so located as to adapt it to pass the non-traveling stop and a set position in which it is so located as to abut the non-traveling stop upon travel of the carriage to a point at which the carriage is substantially centered over the frame of the machine, a manually shiftable setting member for the traveling stop mounted on the carriage to travel bodily therewith and for manual shifting movement relatively to the carriage between a stop-setting position and a normal unset position in which the traveling stop is free to move to its normal unset position, said setting member and traveling stop being pivotally mounted on the carriage for direct shifting of the stop to set position by pressure of said member on the stop upon shifting of the setting member relatively to the carriage from normal to stop-setting position, and a spring for yieldably holding the traveling stop in unset position, said member and traveling stop and spring being so arranged that the member and stop are held against return movement from set position by the spring until the setting member is positively shifted manually in the reverse direction.

23. In a typewriting machine, a traveling platen carriage, a non-traveling carriage stop, a traveling carriage stop mounted on the carriage to travel bodily with the carriage and for shifting movement relatively to the carriage between an unset position in which it is so located as to adapt it to pass the non-traveling stop and a set position in which it is so located as to abut the non-traveling stop upon travel of the carriage to a point at which the carriage is substantially centered over the frame of the machine, a manually shiftable setting member for the traveling stop mounted on the carriage to travel bodily therewith and for manual shifting movement relatively to the carriage between a stop-setting position and a normal unset position in which the traveling stop is free to move to its normal unset position, and a spring for holding the traveling stop in unset position, said member and traveling stop and spring being corelated when the member reaches stop-setting position for mutual engagement of the member and stop under force of the spring in relative positions of the stop and member in which they coact to hold each other against return movement.

24. In a typewriting machine, the combination of a platen carriage, escapement mechanism for the carriage, a non-traveling stop for arresting the carriage, and cooperative manually settable stop mechanism traveling with the carriage comprising two independent members pivotally mounted on the carriage to turn about different axes, one of said members acting directly on the other, when swung in one direction, to swing said other member to and lock it in a position in which its travel will be obstructed by the non-traveling stop when the carriage advances to a substantially centered position widthwise of the machine frame, and means operable by said other member to release and maintain the carriage free of control of the escapement while said member is locked in its position for obstruction by the non-traveling stop.

25. In a typewriting machine, a platen carriage escapement mechanism for the carriage, an unyielding stop pivoted on the carriage, a cooperating unyielding non-traveling stop engageable by the pivoted stop to arrest the carriage in substantially centered position widthwise of the machine frame, a rigid hand-operated member pivoted on the carriage having a handle part and a part for directly engaging and rocking the pivoted stop from an ineffective position into a set position in which it travels in a path for abutment thereof against the non-traveling stop, and a return spring for the pivoted stop normally holding said stop in an unset ineffective position in which it is adapted to travel past the non-traveling stop, said hand-operated member being coactive directly with the pivoted stop to rigidly hold said stop in its set position when said member is rocked to stop-setting position.

26. In a typewriting machine, a platen carriage, escapement mechanism for the carriage, an unyielding stop pivoted on the carriage, a cooperating unyielding non-traveling stop engageable by the pivoted stop to arrest the carriage in substantially centered position widthwise of the machine frame, a rigid hand-operated member pivoted on the carriage having a handle part and a part for directly engaging and rocking the pivoted stop from an ineffective position into a set position in which it travels in a path for abutment thereof against the non-traveling stop, a return spring for the pivoted stop normally holding said stop in an unset ineffective position in which it is adapted to travel past the non-traveling stop, said hand-operated member being coactive directly with the pivoted stop to rigidly hold said stop in its set position when said member is rocked to stop-setting position, and means operable by said pivoted stop during setting thereof to release the carriage from control of the escapement, said releasing means being held in releasing position by the pivoted stop while said stop is held in set position.

In testimony whereof I hereunto affix my signature.

ALONZO B. ELY.